United States Patent [19]

Frankowski

[11] Patent Number: 5,391,226
[45] Date of Patent: * Feb. 21, 1995

[54] RUBBER-CRUMB-REINFORCED CEMENT CONCRETE

[75] Inventor: Richard Frankowski, Mobile, Ala.

[73] Assignee: Tiremix Corporation, Mobile, Ala.

[*] Notice: The portion of the term of this patent subsequent to Mar. 1, 2011 has been disclaimed.

[21] Appl. No.: 179,099

[22] Filed: Jan. 10, 1994

Related U.S. Application Data

[63] Continuation-in-part of Ser. No. 872,494, Apr. 23, 1992, Pat. No. 5,290,356.

[51] Int. Cl.$^6$ ............... C04B 18/22; E01C 05/22
[52] U.S. Cl. ............... 106/696; 106/724; 106/726; 106/745; 404/32; 52/DIG. 7; 52/DIG. 9
[58] Field of Search ............ 106/696, 697, 708, 719, 106/724, 726, 730, 745, 823, DIG. 7; 404/32; 52/DIG. 9, DIG. 7

[56] References Cited

U.S. PATENT DOCUMENTS

| | | | |
|---|---|---|---|
| 3,891,585 | 6/1975 | McDonald | 404/32 |
| 3,930,100 | 12/1975 | McDonald | 404/32 |
| 4,058,405 | 11/1977 | Snyder et al. | 106/87 |
| 4,082,888 | 4/1978 | Portin | 404/32 |
| 4,330,632 | 5/1982 | Haynes et al. | 501/140 |
| 4,450,022 | 5/1984 | Galer | 156/42 |
| 4,488,909 | 12/1984 | Galer et al. | 106/89 |
| 4,504,335 | 3/1985 | Galer | 156/42 |
| 4,564,310 | 1/1986 | Theler et al. | 404/32 |
| 4,615,809 | 10/1986 | King | 210/751 |
| 4,916,004 | 4/1990 | Ensminger et al. | 428/192 |
| 5,032,181 | 7/1991 | Chung | 106/717 |
| 5,244,304 | 9/1993 | Weill et al. | 404/67 |
| 5,290,356 | 3/1994 | Frankowski | 106/726 |

FOREIGN PATENT DOCUMENTS

| | | | |
|---|---|---|---|
| 0092203 | 6/1982 | Japan | 404/32 |
| 338247 | 11/1930 | United Kingdom | 404/32 |
| 763395 | 12/1956 | United Kingdom | 404/32 |
| 0607868 | 5/1978 | U.S.S.R. | 404/32 |

OTHER PUBLICATIONS

ACI Committee 544, *State-Of-The-Art Report On Fiber Reinforced Concrete* (American Concrete Institute 1986) No Month.
*Scrap Tire Connection* Newsletter (Scrap Tire Management Council, Jul. 1992).

*Primary Examiner*—Mark L. Bell
*Assistant Examiner*—Paul Marcantoni
*Attorney, Agent, or Firm*—Pravel, Hewitt, Kimball & Krieger

[57] ABSTRACT

Rubber-crumb-reinforced cement-concrete structures (such as mortar (0), cement board (30), concrete masonry units (40), and concrete pipe (50)) provide resistance to cracking, increase resistance to acid rain, lower weight, improve shock wave absorption, lower heat conductivity and improve the acoustical environment. The structures preferably are made of concrete having a predetermined proportion (from about 1 to about 30 parts by weight per 100 parts by weight of cement) of recycled scrap rubber crumbs which are preferably undirectionally aligned in the cross-section of the structures.

18 Claims, 2 Drawing Sheets

RUBBER-CRUMB-REINFORCED CEMENT CONCRETE

This is a continuation-in-part of U.S. patent application Ser. No. 07/872,494, filed Apr. 23, 1992, now U.S. Pat. No. 5,290,356, and hereby incorporated by reference.

BACKGROUND OF THE INVENTION

1. Field Of The Invention

The present invention relates to improvements in the cement-concrete structures in general and to the following in particular: 1) general purpose and pre-stressed concrete (typically up to 6000 p.s.i. (41.38 MPa)); 2) exterior-interior cement board; 3) mortar; 4) concrete masonry units; and 5) concrete pipe.

2. General Background

Conventional concrete is a mixture of portland cement (including $3CaO \bullet SiO_2$, $2CaO \bullet SiO_2$, $3CaO \bullet Al_2O_3$, $4CaO \bullet Al_2O_3 \bullet Fe_2O_3$), sand, aggregate and water. Fly ash is now being used in combination with portland cement in many portland-cement-based products.

Information about portland cement and conventional concrete can be found in *Design and Control of Concrete Mixtures*, 13th ed. 1988, a booklet produced by the Portland Cement Association, Skokie, Ill.; unless specified otherwise, when the term "concrete" is used herein, it refers to concrete as described in this booklet "Cement", as used herein and unless specified otherwise, refers to the building material described in ASTM (American Society for Testing and Materials) standards and used to make, for example, the building material commonly referred to as concrete. Information about concrete masonry units can be found in Section 4, volume 04.05, pages 68-70 of the 1989 *Annual Book of ASTM Standards*, and in a brochure of Sherman Industries South Alabama Division, Mobile, Ala., entitled "Precast and Concrete Masonry Units". General information about masonry construction can be found in *Structural Details for Masonry Construction* by Morton Newman and published in New York by McGraw-Hill in 1988 and in *Concrete Masonry Handbook for Architects, Engineers, Builder* by Frank A. Randall, Jr. and William C. Panarese (Portland Cement Association 1976).

It has been found that cements containing 1% or more of sodium oxide and potassium oxide will react with aggregates containing opaline silica, highly siliceous rocks and limestone. The formation of the new compounds causes the interior of the concrete to expand, resulting in surface cracking, which for years has been accepted as natural to its use.

Reinforced (steel) concrete was invented by Thaddeus Hatt in 1878, U.S. Pat. No. 206,112 and over the years many improvements have been made in the use of inorganic fibers and others, such as alumina, asbestos, glass, graphite, etc.; the features of which are disclosed, for example, in U.S. Pat. Nos. 3,992,172; 4,316,925; and 4,337,094. Information about fiber-reinforced concrete can be found in *State-of-the-Art Report on Fiber Reinforced Concrete*, publication number ACI 544.1R-82 (reapproved 1986) of the American Concrete Institute, Detroit, Mich.; this publication discloses the use of fibers made of such plastics as nylon, polypropylene, polyethylene, polyester, and rayon.

Cement board is described in *Durock Exterior Cement Board Systems* (publication number SA-700/1-92—1992 ed. of the United States Gypsum Company). Methods of making cement board are described in U.S. Pat. Nos. 4,916,004; 4,504,335; 4,488,909; and 4,450,022. U.S. Pat. No. 4,504,335 discloses the use of aramid fibers in cement board.

Tilt-up concrete walls are described in an article entitled "New technique used to raise walls" by Ron Colquitt on page 1 of Section D of the Aug. 11, 1991 edition of the *Mobile Press Register*.

Concrete is sometimes used to whitetop deteriorating asphalt pavements. See *Whitetopping an Asphalt Parking Area*, publication number PA152.01B of the Portland Cement Association, Skokie, Ill.

Used automobile and truck tires and other scrap rubber are a national environmental problem. Various proposals have been made to deal with the problem, and many of these proposals are being tested. See, for example, *Scrap Tire Use/Disposal Study*—1992 *Update*, an October 1992 publication by A. T. Kearney and available from the Scrap Tire Management Council, Washington, D.C., which describes, among other proposals, the use of scrap tire material in asphalt/paving applications. However, the study does not report favorably on the use of scrap tire material in asphalt/paving applications. An article by Tom Arrandale entitled "Scrap tires a nightmare for solid waste managers" appearing on page 7-B of the May 22, 1992 edition of *The Mobile Press* describes the problems caused by the disposal of old tires.

Cowper, U.K. Pat. No. 338,247, describes a road material which comprises primarily rubber, including crumbed rubber, and includes a small amount of cement. According to the patent, the material can be formed into blocks, bricks, slabs, or sheets.

McDonald, U.S. Pat. No. 3,891,585, discloses an asphalt/rubber pavement material. The preferred size of the rubber particles used therein is stated to be 4 to +200 mesh U.S. Sieve Series. U.S. Pat. No. 3,930,100 discloses a similar material.

Portin, U.S. Pat. No. 4,082,888 discloses a rubber-based paving composition. It does not include cement.

Thelen et al., U.S. Pat. No. 4,564,310, discloses a paving material whose major component by weight consists of scrap rubber from tires. It does not include cement.

Firestone, U.K. Pat. No. 763,395, describes a rubber-containing asphalt paving composition. It does not include cement.

Soviet Patent No. 607,868 discloses a road material including asphalt and rubber crumb, but apparently not including cement.

Japanese Patent publication number 57-92203 discloses a road material which contains asphalt, rubber, and may comprise cement as a filler.

Haynes et al., U.S. Pat. No. 4,330,632, discloses a lightweight concrete which includes polymer-filled aggregate particles. The concrete described in this patent would cost approximately ten times the cost of conventional concrete. In this invention, the polymer serves as a binder.

Chung, U.S. Pat. No. 5,032,181, discloses carbon-fiber-reinforced cement-concrete, with the carbon fibers being present in an amount of about 0.1% to about 4% by weight of the cement. However, as pointed out in Chung, carbon fibers are costly.

Automobiles are up to 16% more efficient when travelling on concrete as compared to asphalt. However, concrete is sometimes passed over for use on roads because of its tendency to crack with time.

An article entitled "Holnam gives up on waste" on page B1 of the Dec. 12, 1992 issue of the *Mobile Register* newspaper discloses a proposal to use scrap tires to make cement. The scrap tires would be used as a kiln fuel to heat raw materials. Residue from the fuel would be mixed into other raw materials. However, there would be little, if any, rubber left in the residue.

The Summer 1992 issue of *Scrap Tire Connection*, the Newsletter of the Scrap Tire Management Council, is devoted to the use of scrap rubber from tires in asphalt pavement. The Newsletter describes the benefits of using rubber in asphalt, but it does not suggest that rubber can be used in concrete.

All publications mentioned herein are hereby incorporated by reference.

All measurements mentioned herein are at standard temperature and pressure, unless otherwise stated.

SUMMARY OF THE PRESENT INVENTION

It is an object of the present invention to provide rubber-crumb-reinforced cement-concrete structures that, when compared to conventional cement-concrete structures, have increased crack resistance and shock wave absorption reduced heat conductivity and noise levels, lighter weight, and increased resistance to acid rain.

In accordance with this invention, these and other objects and advantages are achieved by dispersing rubber (natural and synthetic) in the structures, from about 1% to about 30% by weight of the cement, depending upon product application.

The rubber used is preferably solid rubber crumbs and/or rubber fibers. The rubber crumbs and rubber fibers added to concrete products provide resistance to cracking, improve shock wave absorption, lower heat conductivity, reduce noise levels simultaneously, and increase resistance to acid rain.

The present invention, because it will help prevent cracking of concrete, will allow concrete to be used for more roads than presently. Therefore, because cars are more efficient when traveling on concrete as compared to asphalt, fuel consumption should be reduced.

The present invention can advantageously use rubber crumbs and rubber fibers from old tires. Thus, the present invention is advantageous both in that it provides concrete products with improved characteristics and in that it allows old tires to be recycled.

The present invention can comprise a concrete product made from a mixture comprising 100 parts by weight of cement, 1–30 parts by weight of rubber, 10–70 parts by weight of water, and 100–700 parts by weight of material from the group consisting of sand, aggregate, and light aggregate.

In some concrete products, it may be advantageous to have 5–25 parts by weight of rubber per 100 parts by weight of cement; it is believed that 10–15 parts by weight of rubber per 100 parts by weight of cement will prove to be the most preferable range for most products.

When the the concrete product is general purpose concrete, the amount of water is preferably 40–50 parts by weight, and there are 100–200 parts by weight of sand and 200–400 parts by weight of aggregate.

When the concrete product is mortar, there is preferably 100–350 parts by weight of sand.

When the concrete product is cement board, the amount of rubber is preferably 1–30 parts by weight, the amount of water is preferably 20–50 parts by weight, and there are preferably 100–200 parts by weight of light aggregate.

The rubber is preferably rubber crumb having an average particle size of 35 to 16 mesh U.S. Standard Sieve.

When the concrete product is a concrete masonry unit, the amount of rubber is preferably 1–15 (more preferably 5–15, and most preferably about 10) parts by weight, the amount of water is preferably 10–50 parts by weight, and there are preferably 100–700 parts by weight of light aggregate.

The present invention can comprise a concrete product, such as concrete pipe, mortar, or cement board, made according to ASTM standards for concrete products, but modified to include 1–30 parts by weight of rubber per 100 parts by weight of cement, the rubber being substituted for a substantially equal volume of aggregate, or, in the case of mortar, sand.

The rubber can include rubber crumb having an average particle size of 35 to 16 mesh U.S. Standard Sieve and rubber fibers having an average particle diameter of 35 to 16 mesh U.S. Standard Sieve and an average particle length of 16 to 6 mesh U.S. Standard Sieve.

The rubber can include rubber fibers having an average particle diameter of 35 to 16 mesh U.S. Standard Sieve and an average particle length of 16 to 6 mesh U.S. Standard Sieve.

The present invention can comprise a method of making concrete products, including making a mixture by mixing dry ingredients with water, stirring the mixture until the dry ingredients are properly mixed with the water, and allowing the mixture to cure into a concrete product, and comprising the step of including the ingredients called for by ASTM standards for concrete products, but substituting 1–30 parts by weight of rubber per 100 parts by weight of cement, the rubber being substituted for a substantially equal volume of aggregate, or, in the case of mortar, sand.

The concrete products of the present invention meet applicable ASTM standards for strength. Exemplary ASTM standards for selected concrete products, along with the minimum compressive strength specified in those standards, are as follows:

| Product | Standard No. | Minimum Strength (Compressive) |
| --- | --- | --- |
| Mortar | C 270 | 75–2,500 psi at 28 days |
| Concrete masonry units | C 90 | 600–800 psi |
| Concrete pipe | C 76 | 4000 psi. |

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

The improved cement-concrete structures of this invention preferably comprise cement, sand, aggregates, additive agents and rubber. They can also include fly ash. The rubber, preferably in the form of rubber crumbs and or rubber fibers recovered from scrap, have emerged as a unique and significant reinforcing composite, which when mixed with the above materials produce the following advantages: resistance to cracking, resistance to acid rain, improved shock wave absorption, lowered heat conductivity, and reduced noise levels.

These improvements are particularly valuable in areas of earthquake and hurricane occurrence, e.g., San Francisco, Tokyo, New Orleans, etc.

The preferred embodiments of this invention are described below.

Figure 1:
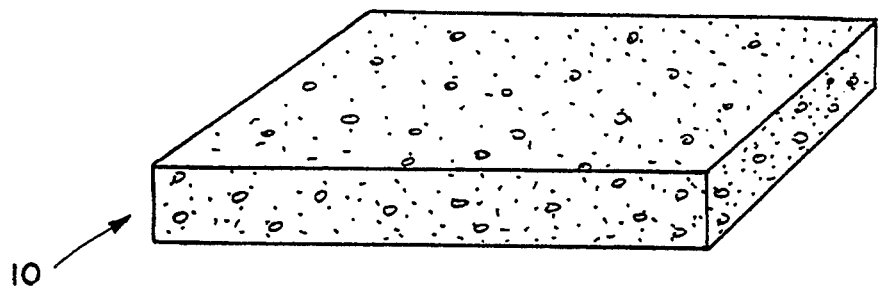
FIG. 1 is a perspective view of concrete of a first embodiment of the present invention.

The concrete 10 of the present invention (see FIG. 1) is rubber-crumb-reinforced cement concrete which can consist of 100 parts by weight of portland cement, from about 100 to 200 parts by weight of sand, from about 200 to 400 parts by weight of aggregate (such as, for example, rocks), from about 1 to 30 parts by weight of rubber crumbs and/or rubber fibers, from about 10 to 70 parts by weight of water and a very small proportion (less than 5 parts by weight) of additives (such as those described in Tables 5-4 and 6-1 of *Design and Control of Concrete Mixtures*), and may also include 1 to 30 parts by weight of fly ash. This concrete is characterized by improved non-structural cracking, shock wave absorption, some chemical resistance to acids and alkaline, heat conductivity reduction, and noise level reduction.

The rubber crumbs in the concrete and concrete products of the present invention preferably have an average particle size of 35 to 16 mesh U.S. Standard Sieve, more preferably have an average particle size of 35 to 20 mesh U.S. Standard Sieve, and most preferably have an average particle size of about 35 to 25 mesh U.S. Standard Sieve, although in general ideal average particle size may vary according to the application. The rubber fibers in the concrete and concrete products of the present invention preferably have an average particle diameter of 35 to 16 mesh U.S. Standard Sieve and an average particle length of 16 to 6 mesh U.S. Standard Sieve, more preferably have an average particle diameter of 20 to 16 mesh U.S. Standard Sieve and an average particle length of 10 to 6 mesh U.S. Standard Sieve, and most preferably have an average particle diameter of 16 mesh U.S. Standard Sieve and an average particle length of 6 mesh U.S. Standard Sieve, although in general ideal average diameter and length may vary according to the application.

The concrete of the present invention can be used to make roads, runways, and concrete pipe, for example.

Test cylinders of concrete were made as described above, and were found to have a compressive strength of over 3000 p.s.i. (20.69 MPa) at 28 days (see the report dated Feb. 1, 1993 attached hereto as Appendix A).

Figure 2:
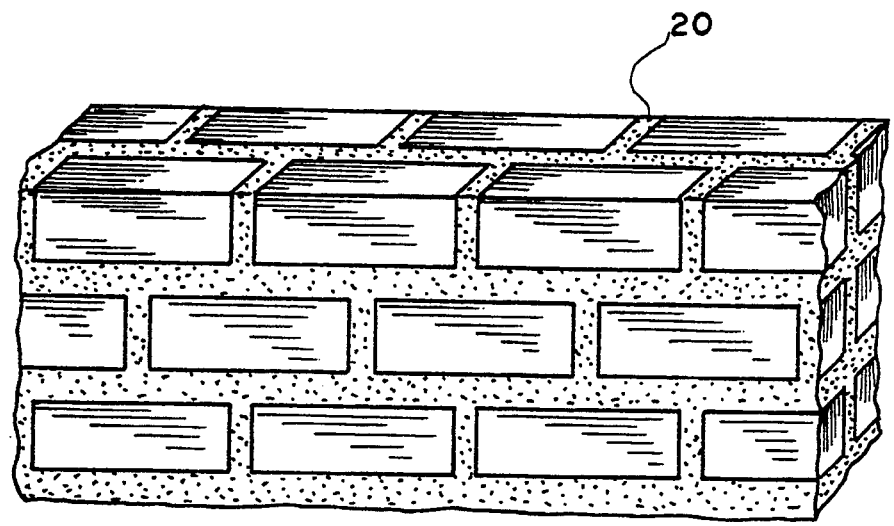
FIG. 2 is a perspective view of a brick wall using mortar of the present invention.

The mortar 20 of the present invention (see FIG. 2) is rubber-crumb-reinforced mortar consisting essentially of 100 parts by weight of masonry cement, from about 200 to 350 parts by weight of sand, from about 1 to 30 parts by weight of rubber crumbs and/or rubber fibers, from about 20 to 70 parts by weight of water and, for cold climates, a very small proportion of additives (such as calcium chloride). The mortar of the present invention can be made, for example, using ASTM standard C270, but substituting 1 to 30 parts by weight of rubber crumb per 100 parts by weight of cement for a like volume of aggregate. This mortar is characterized by reducing cracking and crumbling improvements, heat conductivity reduction, noise level reduction, and shock wave absorption.

Figure 3:
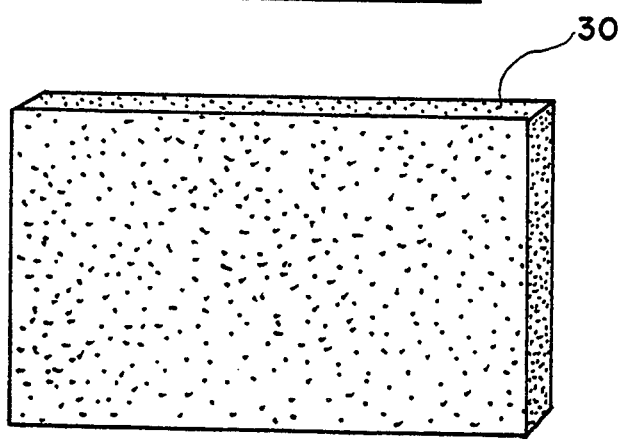
FIG. 3 is a perspective view of a cement board of the present invention.

The cement board 30 of the present invention (see FIG. 3) is rubber-crumb-reinforced exterior-interior cement board (tile backerboard) which can consist of 100 parts by weight of alumina or portland cement, from about 100 to 200 parts by weight of light aggregate (such as expanded shale, clay, slate, or slag, or gravelite, livlite, or galite), from about 1 to 30 parts by weight of rubber crumbs and/or rubber fibers, from about 20 to 60 parts by weight of water and a very small proportion (less than 5 parts by weight) of additives (such as those described in Tables 5-4 and 6-1 of *Design and Control of Concrete Mixtures*), and may also include 1 to 30 parts by weight of fly ash. This cement board has improved heat conductivity resistance, noise level reduction, and shock wave absorption as compared to standard cement board. The cement board 30 of the present invention can be made as described in U.S. Pat. Nos. 4,916,004; 4,504,335; 4,488,909; or 4,450,022, with 1 to 30 parts by weight of rubber crumbs and/or rubber fibers per 100 parts by weight of cement, the rubber taking the place of a like volume of light aggregate.

Figure 4:
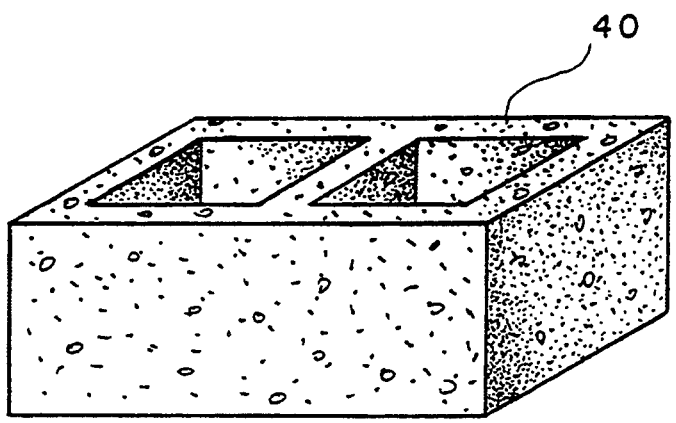
FIG. 4 is a concrete masonry unit of the present invention.

The concrete masonry units (CMUs) 40 of the present invention (see FIG. 4) are rubber-crumb-reinforced CMUs consisting of 100 parts by weight of alumina or portland cement, from about 100 to 700 parts by weight of light aggregate (such as expanded shale, clay, slate, or slag, or gravelite, livlite, or galite), from about 1 to 30 parts by weight of rubber crumbs, from about 10 to 30 parts by weight of water and a very small proportion (less than 5 parts by weight) of additives (such as those described in Tables 5-4 and 6-1 of *Design and Control of Concrete Mixtures*), and may also include 1 to 30 parts by weight of fly ash. These CMUs have improved heat conductivity resistance, noise level reduction, and shock wave absorption as compared to standard or lightweight CMUs. These CMUs can have the shapes shown in *Structural Details for Masonry Construction* by Morton Newman. An exemplary shape is shown in FIG. 4.

Tests were conducted using CMUs as described above to determine whether deleterious mineral phases would form when the CMUs of the present invention are exposed to fire. The report of the tests (attached as Appendix B) demonstrate that no deleterious mineral phases are formed. Further, another test was performed to determine compressive strength, and it was found that compressive strength of the CMUs with rubber crumb actually increased after being exposed to fire. In particular, before firing, the compressive strength of CMUs containing rubber had a lower compressive strength than CMUs not containing rubber; after firing, the compressive strength of CMUs containing rubber had a higher compressive strength than CMUs not containing rubber. This is advantageous in that a fire in a building made with CMUs of the present invention will actually strengthen, not weaken, the building, so that the building will not need to be torn down after the fire.

It is believed that the same will result with other types of concrete products.

Figure 5:
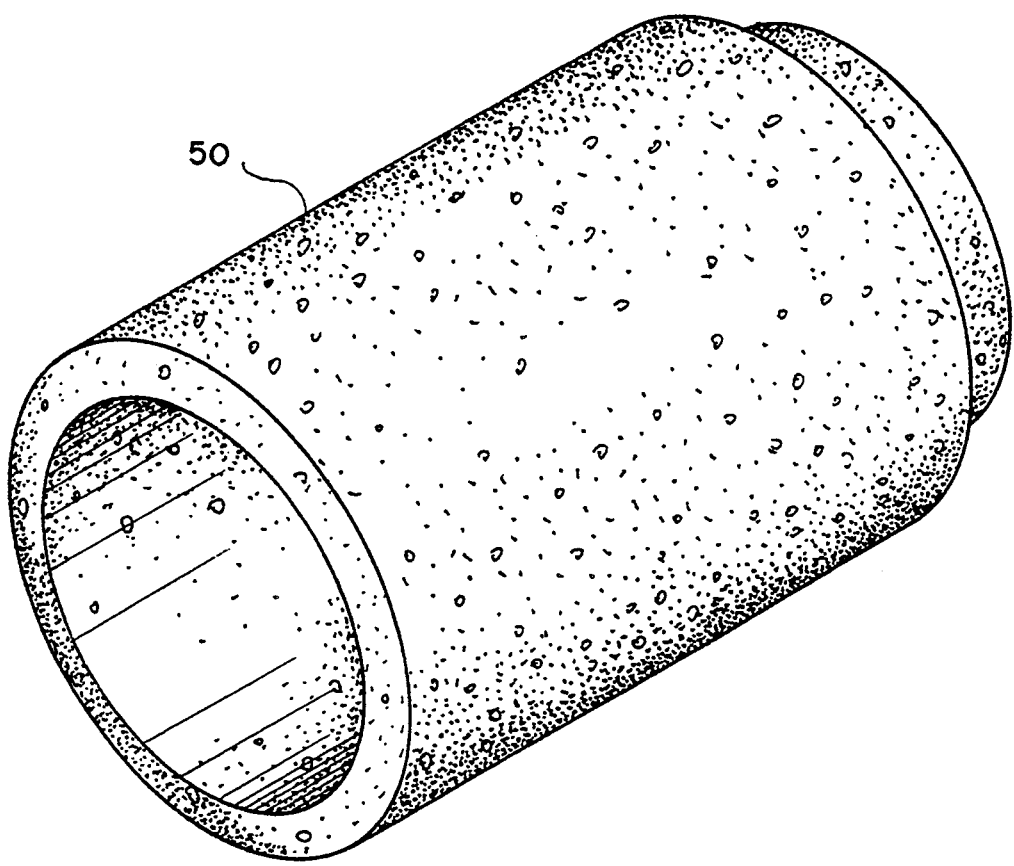
FIG. 5 is a concrete pipe of the present invention.

The concrete pipe 50 of the present invention (see FIG. 5) is rubber-crumb-reinforced cement concrete pipe which can be made with the same ingredients as concrete 10, or can be made according to ASTM standards for concrete pipe, but substituting 1 to 30 parts by weight of rubber crumb per 100 parts by weight of cement for a like volume of aggregate.

The new structures described herein made of cement-like material preferably have as a discrete internal portion of the cross-section a predetermined undirectionally aligned reinforcement comprising recycled scrap rubber crumbs (natural and/or synthetic) (1 to 30 parts by weight per 100 parts by weight of cement), which provide the following benefits: 1) crack resistance; 2) heat conductivity reduction; 3) shock wave absorption and crumbling reduction; 4) noise level reduction; and 5) weight reduction (the present invention is lighter in weight than most commercially available concrete products).

When a mixture is described herein as including so many parts of a substance, without specifying otherwise, it indicates parts by weight.

The rubber crumb used to make the products described in the attached reports was ground natural rubber produced from scrap tires free of foreign material, steel, and fabric. It was black in color and had the characteristics listed in Table 1.

TABLE 1

| Characteristics of Rubber Crumb | | |
|---|---|---|
| Product Analysis | Minimum | Maximum |
| Acetone Extract | 10.0% | 17.5% |
| Carbon Black | 26.0% | 38.0% |
| Moisture Content | — | 0.50% |
| Ash Content | 1.0% | 7.0% |
| Rubber | 45.0% | — |

The rubber crumb used to produce the CMUs described in the report attached as Appendix A was 20 mesh rubber crumb and had the size characteristics shown in Table 2.

TABLE 2

| Mesh Size of Rubber Crumb U.S. STANDARD SIEVE ANALYSIS - % RETAINED 20 Mesh Ground Rubber | |
|---|---|
| 16 m | Trace |
| 20 m | 0-5% max. |
| 30 m | 25% min. |
| 40 m | — |

The present invention is a useful, practical solution to the environmental problem of used tire disposal. In addition, it has been found that the CMUs of the present invention have the following advantages as compared to conventional CMUs: 1) improved crack resistance; 2) improved mildew resistance (because of porosity reduction); 3) lighter weight; 4) more fire resistant (because the aggregate becomes impregnated with rubber, and thus is not as brittle when heated); 5) permeability reduction; 6) "R" factor improvement (i.e., lower thermal conductivity); 7) aesthetic quality improvement; 8) noise level reduction; and 9) increased handling damage resistance.

It is believed that all concrete products made with rubber crumbs and/or rubber fibers as described herein will have the same benefits.

The concrete products of the present invention can be made by following ASTM or other conventional standards but substituting 1 to 30 parts by weight of rubber crumbs and/or rubber fibers as described herein per 100 parts by weight of cement for a like (i.e., an equal) volume of aggregate (or, when making mortar, for a like volume of sand). The concrete of the present invention can be used to make concrete beams, concrete building materials, namely concrete masonry units (concrete blocks), bricks, posts, poles, slabs, panels, and cement board, concrete pipe, ready-mix concrete, and concrete furniture.

Preliminary testing indicates that CMUs made in accordance with the present invention actually become stronger after being exposed to fire, thus making them a desirable building material, for a fire will strengthen a building made with CMUs of the present invention, rather than weaken it, so CMU walls will not need to be torn down when buildings burn; therefore, insurance premiums should be lower when blocks according to the present invention are used, especially in places such as California where fires are rather common.

Rubber fibers tend to stick out of the concrete and mortar and may be difficult to paint; further, some people may consider them unsightly. Thus, for aesthetic reasons, and for purposes of painting, it may be better to use only rubber crumbs, and not rubber fibers, when the concrete, concrete products, or mortar will be exposed to view.

The following table lists the part numbers and part descriptions as used herein and in the drawings attached hereto.

| PARTS LIST | |
|---|---|
| Part Number | Description |
| 10 | conventional and pre-stressed concrete |
| 20 | mortar |
| 30 | interior-exterior cement board |
| 40 | concrete masonry unit |
| 50 | concrete pipe |

While the above embodiments of this invention have been described, it is understood that the invention is capable of other embodiments. Also, it should be understood that the rubber-crumb-reinforced cement concrete terminology employed herein is intended to be generic and should not be regarded as limiting.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense. As used herein, "aggregate" and "light aggregate" do not include sand.

What is claimed as invention is:

1. A concrete product made from a mixture consisting essentially of:
   a) 100 parts by weight of cement;
   b) 1–30 parts by weight of rubber;
   c) 10–70 parts by weight of water; and
   d) 100–700 parts by weight of material from the group consisting of sand, aggregate, and light aggregate, the concrete product having a compressive strength of at least 75 p.s.i.

2. The invention of claim 1, wherein:

the concrete product is general purpose concrete,
the amount of water is 40–50 parts by weight, and
the material in part (d) is 100–200 parts by weight of sand and 200–400 parts by weight of aggregate.

3. The invention of claim 1, wherein:
the concrete product is mortar, and
the material in part (d) is 100–350 parts by weight of sand.

4. The invention of claim 1, wherein:
the concrete product is cement board,
the amount of rubber is 1–30 parts by weight,
the amount of water is 20–50 parts by weight, and
the material in part (d) is 100–200 parts by weight of light aggregate.

5. The invention of claim 1, wherein:
the rubber is rubber crumb having an average particle size of 35 to 16 mesh U.S. Standard Sieve.

6. The invention of claim 1, wherein:
the concrete product is a concrete masonry unit,
the amount of rubber is 1–15 parts by weight,
the amount of water is 10–50 parts by weight, and
the material in part (d) is 100–700 parts by weight of light aggregate.

7. A concrete product made according to ASTM standards for concrete products, but modified to include 1–30 parts by weight of rubber per 100 parts by weight of cement, the rubber being substituted for a substantially equal volume of aggregate, or, in the case of mortar, sand,
the concrete product having a compressive strength of at least 75 p.s.i.

8. The invention of claim 7, wherein:
the rubber includes rubber crumb having an average particle size of 35 to 16 mesh U.S. Standard Sieve.

9. The invention of claim 7, wherein:
the rubber includes rubber crumb having an average particle size of 35 to 16 mesh U.S. Standard Sieve and rubber fibers having an average particle diameter of 35 to 16 mesh U.S. Standard Sieve and an average particle length of 16 to 6 mesh U.S. Standard Sieve.

10. The invention of claim 7, wherein:
the rubber includes rubber fibers having an average particle diameter of 35 to 16 mesh U.S. Standard Sieve and an average particle length of 16 to 6 mesh U.S. Standard Sieve.

11. The invention of claim 7, wherein:
the concrete product is a concrete pipe.

12. The invention of claim 7, wherein:
the concrete product is mortar.

13. The invention of claim 7, wherein:
the concrete product is cement board.

14. A method of making concrete products, including:
making a mixture by mixing dry ingredients with water;
stirring the mixture until the dry ingredients are properly mixed with the water; and
allowing the mixture to cure into a concrete product,
wherein the ingredients consist essentially of the ingredients called for by ASTM standards for concrete products, but substituting 1–30 parts by weight of rubber per 100 parts by weight of cement, the rubber being substituted for a substantially equal volume of aggregate, or, in the case of mortar, sand,
the concrete products having a compressive strength of at least 75 p.s.i.

15. The method of claim 14, wherein:
the rubber includes rubber crumb having an average particle size of 35 to 16 mesh U.S. standard Sieve.

16. The method of claim 14, wherein:
the rubber includes rubber crumb having an average particle size of 35 to 16 mesh U.S. Standard Sieve and rubber fibers having an average particle diameter of 35 to 16 mesh U.S. Standard Sieve and an average particle length of 16 to 6 mesh U.S. Standard Sieve.

17. The method of claim 14, wherein:
the rubber includes rubber fibers having an average particle diameter of 35 to 16 mesh U.S. Standard Sieve and an average particle length of 16 to 6 mesh U.S. Standard Sieve.

18. The method of claim 14, wherein:
the concrete product meets applicable ASTM standards for strength.

* * * * *